March 14, 1950 S. W. SEELEY 2,500,581

FREQUENCY DIVIDER

Filed Oct. 25, 1945

INVENTOR.

Stuart W. Seeley

BY C. D. Tuska

ATTORNEY

Patented Mar. 14, 1950 2,500,581

UNITED STATES PATENT OFFICE 2,500,581

FREQUENCY DIVIDER

Stuart W. Seeley, Roslyn Heights, N. Y., assignor to Radio Corporation of America, a corporation of Delaware Application October 25, 1945, Serial No. 624,511

6 Claims. (Cl. 250—27)

My invention relates to frequency dividers and particularly to systems for producing periodic electrical pulses at selected periodic rates.

It is sometimes desirable to employ a frequency divider chain so designed that the signal output may have its frequency or repetition period changed by definite small amounts. For example, in a frequency divider that produces one pulse at the divider output for every 400 cycles applied to the input, that is, in a divider that ordinarily divides by 400, it may be desirable to selectively switch or adjust the divider circuit so that one pulse is produced at the output for every 397 cycles applied to the divider input.

Since 397 is a prime number, no counter chain with more than one dividing stage could be arranged to divide an input frequency by that number. Furthermore, since single counter stages are unstable for counts of more than 15 or so, the problem of dividing an input frequency by some high prime number has been difficult of solution. With the circuit here described, by way of example, the count of the input frequency may be varied in integral steps from 400 input cycles per output pulse down to 200 input cycles per output pulse.

An object of the invention is to provide an improved frequency divider circuit.

A further object of the invention is to provide an improved method of and means for producing periodic electrical pulses at selected periodic rates.

In practicing a preferred embodiment of the invention, a frequency divider chain, such as a chain of blocking oscillator and counter circuits, has a sine wave input signal supplied to it through a rectifier circuit that may be made to function at selected intervals as either a single wave rectifier or as a double wave rectifier. During the time the rectifier functions as a single wave rectifier, one pulse per input signal cycle is applied to the divider chain; during the time the rectifier functions as a double wave rectifier, two pulses per input signal cycle are applied to the divider chain. The duration of the period that the rectifier circuit functions as a double wave rectifier is determined by the duration of a pulse that is applied to one of the rectifier tubes and which is produced in response to the production of a divider chain output pulse.

Thus, if one output pulse is to be produced for every 397 input cycles, the rectifier control pulse is given a width or duration of three input cycles whereby three extra input pulses are produced as compared with the number of input pulses resulting from single wave rectifier action only. Consequently, 397 input cycles produce 400 pulses at the divider input whereby one pulse appears at the divider output.

Figure 1:
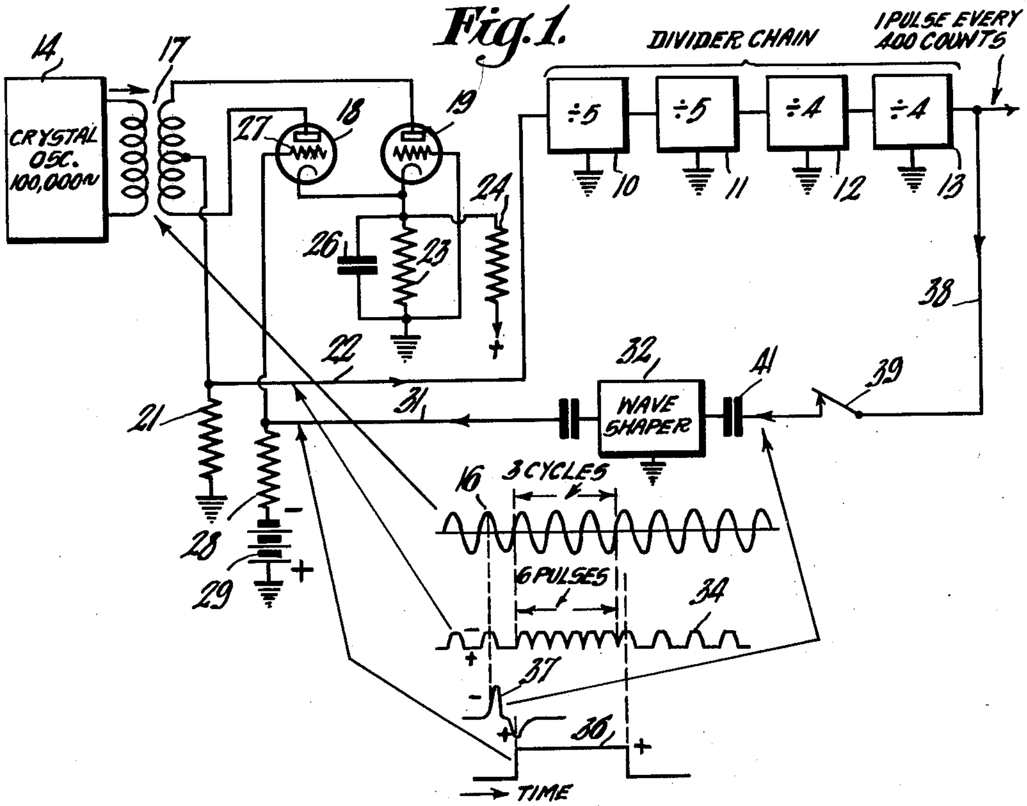
Figure 2:
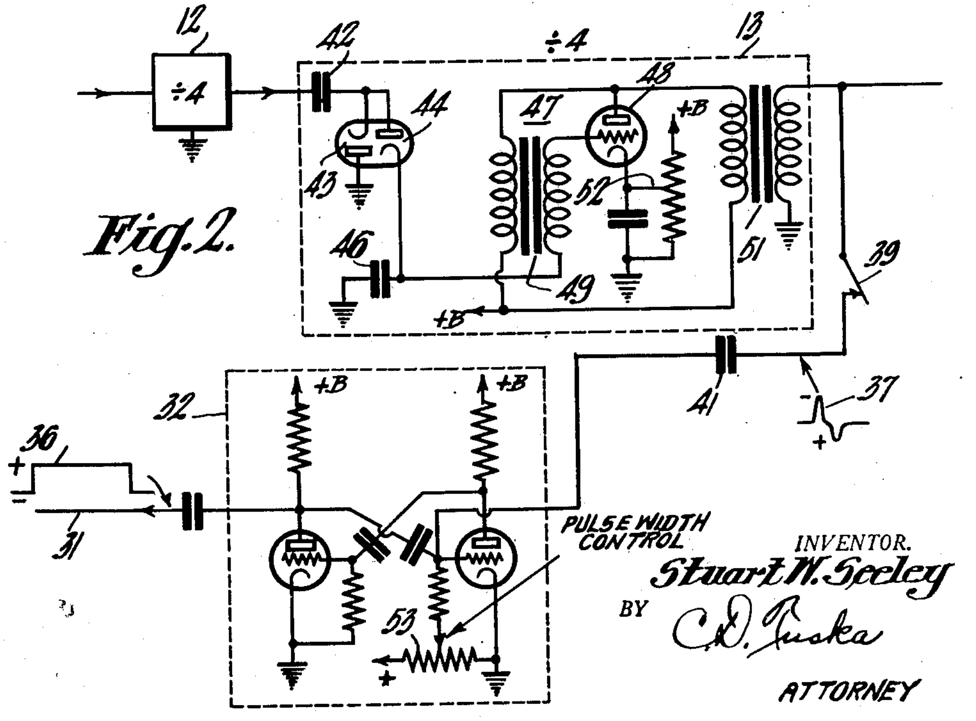

The invention will be better understood from the following description taken in connection with the accompanying drawing in which Figure 1 is a circuit and block diagram of a frequency divider embodying the invention, and Figure 2 is a circuit diagram of a portion of the frequency divider shown in Figure 1. In the two figures, similar parts are indicated by similar reference characters.

Referring to Fig. 1, there is shown by way of example a frequency divider chain comprising divider units 10, 11, 12 and 13 which divide in steps of 5, 5, 4 and 4, respectively. The input signal to the frequency divider is supplied from a crystal oscillator 14 operating to produce a 100,000 cycles per second sine wave output represented by the graph 16.

The 100,000 cycle signal is supplied to the frequency divider chain through a rectifier circuit comprising an input transformer 17 and a pair of three-element vacuum tubes 18 and 19. Opposite ends of the secondary of transformer 17 are conected to the anodes of the tubes 18 and 19, respectively, while the center point of the secondary is connected through an output resistor 21 to ground. The signal appearing across the output resistor 21 is supplied over a conductor 22 to the input end of the frequency divider chain.

The cathodes of the tubes 18 and 19 preferably are biased slightly positive with respect to ground by connecting them to the junction point of two series connected bleeder resistors 23 and 24. The resistor 23 is shunted by a by-pass capacitor 26.

The rectifier tube 18 is normally biased sufficiently beyond plate current cut-off so that it does not rectify by connecting its control grid 27 through a resistor 28 to the negative end of a biasing source 29. The tube 18 may be made to rectify for a predetermined interval by applying a positive pulse 36 to the grid 27 by way of a conductor 31. The positive pulse 36 is supplied from a wave shaper circuit 32 in response to the production of a pulse at the output end of the frequency divider chain as explained hereinafter.

The rectifier tube 19 always functions as a rectifier. Its control grid 33 is connected to ground whereby it is negative with respect to the positively biased cathode. The positive bias on the cathodes of the rectifier tubes 18 and 19 is provided to flatten the tops of the rectified pulses for more reliable operation of the first frequency divider unit 10.

Graph 34 shows the rectified pulses which are supplied from the rectifier output resistor 21 to the frequency divider input end for the case where the positive pulse 36 from the wave shaper 32 unblocks the rectifier tube 18 for the duration of three input cycles.

The pulse 36 from the wave shaper 32 is produced in response to the production of each output pulse 37 of the frequency divider chain. The output pulses 37 are supplied to the wave shaper 32 through a conductor 38, a switch 39 and a capacitor 41.

Reference will now be made to Fig. 2 which illustrates, by way of example, the circuit of a suitable frequency divider unit and the circuit of a suitable wave shaper. The divider unit 13 is of the counter-blocking oscillator type described in White Patent 2,113,011, issued April 5, 1938. It comprises a counter consisting of an input capacitor 42, a pair of diodes 43 and 44, and a storage capacitor 46 across which the voltage builds up in steps as pulses are applied to the input capacitor. The divider 13 further comprises a blocking oscillator 47 that includes a vacuum tube 48, a feed-back transformer 49 and an output transformer 51. The cathode bias for the tube 48 may be adjusted by a tap 52. In operation, when the voltage across capacitor 46 builds up to a predetermined value, the oscillator 47 is triggered and it produces a pulse 37 that is supplied through the transformer 51 to the multivibrator wave shaper 32 which, in this instance, is triggered by the second kick of the blocking oscillator pulse. The other divider units may be of the same type as the unit 13.

Various wave shaper circuits may be employed for the unit 32. In the example shown, the unit 32 is a multivibrator of well known design which has an adjustable positive bias applied to the grid of one of the vacuum tubes by way of an adjustable tap 53. The width of the pulse 36 may be changed by adjusting the tap 53, thus determining the number of cycles of the crystal oscillator output required to produce a pulse at the output end of the divider chain. As previously stated, with the circuit described by way of example, the count of the input frequency may be varied from 400 down to 200 in integral steps. This range of control requires that the pulse 36, which unblocks the normally quiescent rectifier triode 18, may be accurately varied in width or duration from 0 percent to 100 percent of the period between the output pulses 37 of the divider chain.

It may be noted that the invention may be particularly useful in navigation systems such as the Loran system in which separation of stations is effected by selecting different repetition rates for the divider chain output. Also, it may be useful in radio navigation systems of the type that avoid adjacent station interference by the process known as "scrambling" which consists in making the divider output pulses start at random times periodically. In the circuit illustrated, this may be done either by opening the switch 39 periodically for short intervals or, if switch 39 is normally open, by closing it periodically for short intervals.

It will be understood that the frequency divider circuit may be controlled by the reverse action of that illustrated and described above. Specifically, the tube 18 may be biased to function as a rectifier in the absence of a control pulse that is the same as the pulse 36 but of negative polarity. With this arrangement, the rectifier tube 18 is blocked in response to and for the duration of the control pulse. It is to be understood that the claims cover this reverse action as well as the action specifically illustrated.

I claim as my invention:

1. In combination, a source of periodic voltage having positive and negative half cycles, a plurality of frequency dividers connected in cascade to form a divider chain, a rectifier circuit, said rectifier circuit having an input circuit connected to said source and having an output circuit connected to the input end of said divider chain, means for causing said rectifier circuit to function normally as a single wave rectifier, means for producing a control voltage pulse in response to the production of a pulse at the output end of said divider chain, and means for applying said control pulse to said rectifier circuit and for causing it to function as a double wave rectifier for a predetermined period.

2. The invention according to claim 1 wherein the duration of said control pulse does not exceed the repetition period of the pulses appearing at the output end of said divider chain.

3. The invention according to claim 1 wherein means is provided for varying the width or duration of said control pulse.

4. In combination, a source of periodic voltage having positive and negative half cycles, a plurality of frequency dividers connected in cascade to form a divider chain, a double wave rectifier circuit comprising two rectifier devices, said rectifier circuit having an input circuit connected to said soure and having an output circuit connected to the input end of said divider chain, means for normally blocking one of the rectifier devices of said rectifier circuit whereby said rectifier circuit functions normally as a single wave rectifier, means for producing a control voltage pulse in response to the production of a pulse at the output end of said divider chain, and means for applying said control pulse to said normally blocked rectifier device with a polarity and amplitude such that it is unblocked for a predetermined period during which said rectifier circuit functions as a double wave rectifier.

5. In combination, a source of periodic voltage having positive and negative half cycles, a plurality of frequency dividers connected in cascade to form a divider chain, a double wave rectifier circuit comprising two rectifier devices, said rectifier circuit having an input circuit connected to said source and having an output circuit connected to the input end of said divider chain, means for normally blocking one of the rectifier devices of said rectifier circuit whereby said rectifier circuit functions normally as a single wave rectifier, means for producing a control voltage pulse in response to the production of a pulse at the output end of said divider chain, means for varying the width or duration of said control pulse, and means for applying said control pulse to said normally blocked rectifier device with a polarity and amplitude such that it is unblocked for a predetermined period during which said rectifier circuit functions as a double wave rectifier.

6. In a system which includes a chain of frequency divider units, the method of frequency dividing a periodic signal having positive and negative half cycles which comprises supplying alternate half cycles as pulses of a certain polarity to said divider chain whereby periodic pulses at a reduced repetition rate are produced in the output circuit of said divider chain, and supplying the other of said half cycles also as pulses of said certain polarity to said divider chain during a predetermined number of said cycles and during the period between successive output pulses of said divider chain.

STUART W. SEELEY.

REFERENCES CITED

The following references are of record in the file of this patent:

UNITED STATES PATENTS

| Number | Name | Date |
|---|---|---|
| 2,349,810 | Cook | May 30, 1944 |
| 2,399,135 | Miller | Apr. 23, 1946 |
| 2,404,047 | Flory | July 16, 1946 |

OTHER REFERENCES

Potter, "Electronics," June 1944, pp. 110–113, 358.